United States Patent
Ihm et al.

(10) Patent No.: US 8,559,541 B2
(45) Date of Patent: Oct. 15, 2013

(54) METHOD OF TRANSMITTING SIGNALS FOR MULTIPLE ANTENNA SYSTEM

(75) Inventors: Bin Chul Ihm, Gyeonggi-do (KR); Moon Il Lee, Gyeonggi-do (KR); Jin Young Chun, Seoul (KR); Wook Bong Lee, Gyeonggi-do (KR); Jae Won Chang, Gyeonggi-do (KR); Jin Hyuk Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 580 days.

(21) Appl. No.: 12/096,560

(22) PCT Filed: Dec. 6, 2006

(86) PCT No.: PCT/KR2006/005233
§ 371 (c)(1),
(2), (4) Date: Oct. 22, 2008

(87) PCT Pub. No.: WO2007/066972
PCT Pub. Date: Jun. 14, 2007

(65) Prior Publication Data
US 2009/0316822 A1    Dec. 24, 2009

(30) Foreign Application Priority Data

Dec. 6, 2005 (KR) .................. 10-2005-0118210
Dec. 20, 2005 (KR) .................. 10-2005-0126201

(51) Int. Cl.
*H04B 7/02* (2006.01)
(52) U.S. Cl.
USPC ........... 375/267; 375/260; 375/299; 375/347; 375/349
(58) Field of Classification Search
USPC .................. 375/267, 260, 299, 347, 349
See application file for complete search history.

(56) References Cited

U.S. PATENT DOCUMENTS

| 2004/0081254 | A1  | 4/2004 | Tirkkonen |
| 2004/0114618 | A1* | 6/2004 | Tong et al. ............. 370/431 |
| 2005/0041751 | A1  | 2/2005 | Nir et al. |
| 2005/0105629 | A1* | 5/2005 | Hottinen et al. .......... 375/261 |

FOREIGN PATENT DOCUMENTS

| KR | 20040032730  | 4/2004  |
| KR | 1020070065596 | 6/2007  |
| WO | 99/18682     | 4/1999  |
| WO | 00/14921     | 3/2000  |
| WO | 01/56218     | 8/2001  |
| WO | 02/080375    | 11/2002 |

OTHER PUBLICATIONS

Erik Lindskog et al., "Space-Time Codes for 3 Transmit antennas for the OFDMA PHY", IEEE 802.16 Broadband Wireless Access Working Group, IEEE C802.16e-04/208r1, Jul. 2004.

* cited by examiner

*Primary Examiner* — Kabir A Timory
(74) *Attorney, Agent, or Firm* — Lee, Hong, Degerman, Kang & Waimey (57) ABSTRACT

A signal transmission method for use in a multi-antenna system includes: receiving a complex signal using N antennas and M timeslots as a single unit, and generating a space-time code (STC) for performing interleaving and phase-shifting operations of the received complex signal; and applying the space-time code (STC) to the received complex signal, and transmitting the resultant signal. Therefore, the signal transmission method provides a space-time code (STC) provides a space-time code (STC) having higher performance and lower encoding complexity, and can effectively transmit the signal via the multi-antenna system.

5 Claims, 8 Drawing Sheets

METHOD OF TRANSMITTING SIGNALS FOR MULTIPLE ANTENNA SYSTEM

CROSS-REFERENCE TO RELATED APPLICATIONS

This application is the National Stage filing under 35 U.S.C. 371 of International Application No. PCT/KR2006/005233, filed on Dec. 6, 2006, which claims the benefit of earlier filing date and right of priority to Korean Application Nos. 10-2005-0118210, filed on Dec. 6, 2005, and 10-2005-0126201, filed on Dec. 20, 2005.

TECHNICAL FIELD

The present invention relates to a method for transmitting a signal in a multi-antenna system, and more particularly to a method for transmitting a signal using a space-time code (STC) code having a superior performance.

BACKGROUND ART

In recent times, with the increasing development of information communication technologies and the widespread use of a variety of multimedia services, high-quality communication services are being developed and introduced to the market, and the demand of users who desire to use the high-quality communication services is being abruptly increased.

In order to actively cope with the increasing demand of the users, capacity of a communication system must be increased. Basically, available frequency resources are limited under wireless communication environments. In order to increase communication capacity under the wireless communication environments, there is a need to more effectively use an available frequency band.

In order to increase efficiency of radio resources, a variety of communication methods for use of STC (Space Time Code) or spatial multiplexing (SM) techniques have been proposed.

In more detail, the above-mentioned STC communication method mounts a plurality of antennas to a transmission/reception unit to additional guarantee a spatial area for utilization of resources, such that it can increase reliability of a communication link via a diversity gain without increasing a bandwidth. The above-mentioned SM communication method performs parallel transmission of data, such that it can increase data transmission capacity.

Besides, a Full Diversity Full Rate Space Time Code (FDFR-STC) technique for simultaneously acquiring a multiplexing gain and a spatial multiplexing gain has been recently proposed.

Figure 1:
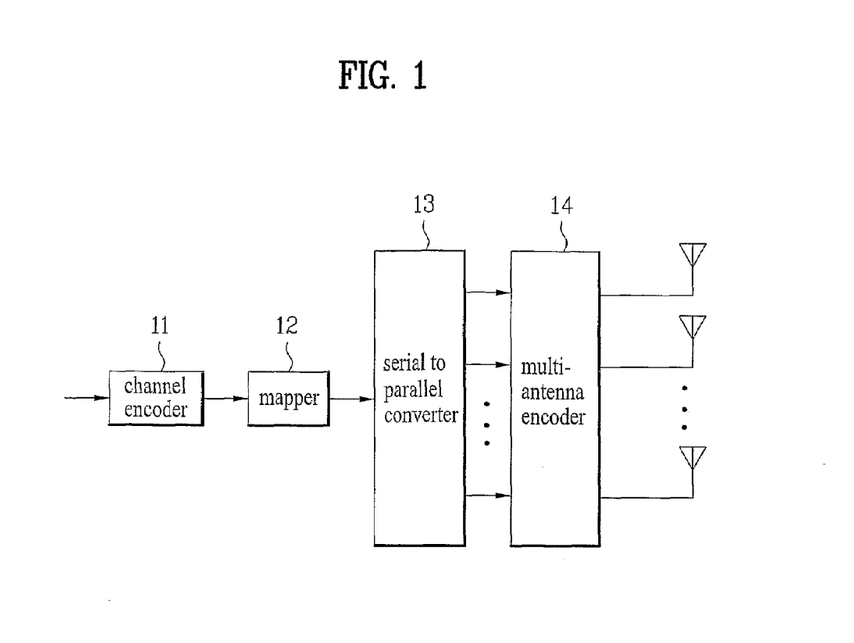
FIG. 1 is a block diagram illustrating a transmitter equipped with a multi-antenna.

FIG. 1 is a block diagram illustrating a transmitter having a multi-antenna.

Referring to FIG. 1, the transmitter includes a channel encoder 11, a mapper 12, a serial/parallel converter 13, and a multi-antenna encoder 14.

The channel encoder 11 performs the channel encoding of an input data bit according to a predetermined algorithm. The channel encoding process adds a redundancy bit to the input data bit, such that it can generate a robust signal which has very strong resistance to noise. The mapper 12 performs the constellation mapping of the channel-encoded bit, and converts the mapped bit into a symbol. The serial/parallel converter 13 converts the serial symbol generated from the mapper 12 into a parallel symbol, such that the symbol generated from the mapper 12 can be transmitted via a multi-antenna. The multi-antenna encoder 14 converts the parallel channel symbols into a multi-antenna symbol.

Figure 2:
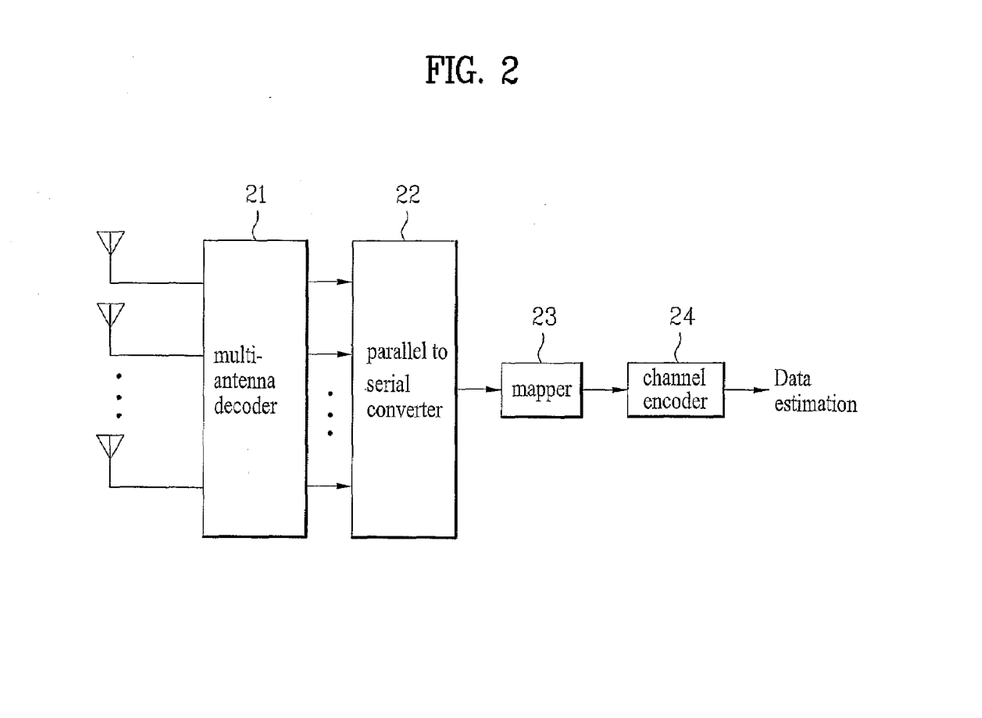
FIG. 2 is a block diagram illustrating a receiver equipped with a multi-antenna.

FIG. 2 is a block diagram illustrating a receiver equipped with a multi-antenna.

Referring to FIG. 2, the receiver includes a multi-antenna encoder 21, a parallel/serial converter 22, a demapper 23, and a channel decoder 24. The multi-antenna encoder 21 receives the multi-antenna symbol, and converts the received multi-antenna symbol into a channel symbol. The parallel/serial converter 22 converts the parallel channel symbols into serial channel symbol. The demapper 23 performs the constellation demapping of the serial channel symbol. The channel decoder 24 decodes the bits received from the demapper 23.

If the multi-antenna encoding is performed as described above, a multi-antenna gain is changed according to the encoding methods. Therefore, a Full Diversity-Full Rate Space Time Coding (FDF-STC) is required to acquire an optimum performance.

Data transmission capacity of the wireless communication system can be considerably increased using the above-mentioned Multiple-Input Multiple-Output (MIMO) technology.

A representative conventional art of the MIMO technology has been proposed by Alamouti, entitled "A SIMPLE TRANSMIT DIVERSITY TECHNIQUE FOR WIRELESS COMMUNICATIONS", IEEE JSAC, vol. 16. No. 8, October 1998, which is incorporated herein by reference. The above-mentioned conventional art of Alamouti relates to a Transmit Diversity technique for obviating the fading of RF channels using a plurality of antennas contained in the transmission/reception unit. The above-mentioned conventional art of Alamouti is indicative of a method for transmitting data via two transmission antennas, has a diversity order corresponding to the product of the number of transmission antennas and the number of reception antennas, such that it can acquire a maximum diversity gain (also called a "full diversity gain").

However, the above-mentioned conventional art of Alamouti has been designed to transmit only two data symbols during two time slots via two transmission antennas, such that a transmission rate of 1 is acquired. As a result, the conventional art of Alamouti cannot acquire a spatial multiplexing gain irrespective of the number of reception antennas. The conventional art of Alamouti has not proposed a data transmission method for a specific case when three or more transmission antennas are used.

In the meantime, a representative example for acquiring a spatial multiplexing (SM) gain is a Vertical Bell Laboratories Layered Space-Time (V-BLAST) method, entitled "DETECTION ALGORITHM AND INITIAL LABORATORY RESULTS USING V-BLAST SPACE-TIME COMMUNICATION ARCHITECTURE", IEEE, Vol. 35, No. 1, pp. 14~16, 1999.

According to the above-mentioned example for acquiring the SM gain, a transmitter simultaneously transmits different signals of individual transmission antennas at the same transmission power and the same transmission rate. A receiver detects the signal of the transmitter using three methods, i.e., a detection ordering method, an interference nulling method, and an interference cancellation method, etc., such that it removes an unnecessary interference signal from the received signal, resulting in the increased SNR.

The above-mentioned conventional method for acquiring the SM gain can simultaneously transmit separate data signals equal to the number of transmission antennas on the assumption that the number of reception antennas is equal to the number of transmission antennas, such that the spatial multiplexing (SM) gain can be maintained at a maximum value.

However, the above-mentioned conventional method has a disadvantage in that the number of reception antennas should be higher than the number of transmission antennas. In order to maximize the multiplexing gain, the diversity gain cannot be acquired at the diversity order of 1. If a signal is wrongly recovered under the poor channel environment, the wrongly-recovered signal may unavoidably affect the next transmission signal, resulting in the deterioration of performance.

In the meantime, a representative example of a titled-QAM scheme has been introduced in Globecom conference, entitled "STRUCTURED SPACE-TIME BLOCK CODES WITH OPTIMAL DIVERSITY-MULTIPLEXING TRADEOFF AND MINIMUM DELAY", pp. 1941~1945, 2003, which is hereby incorporated by reference.

The above-mentioned tilted-QAM scheme of the Globecom conference relates to the STC code for acquiring a Full Diversity & Full Rate (FDFR) capable of satisfying an optimum diversity-multiplexing tradeoff scheme. The above-mentioned tilted-QAM scheme employs a short space-time block code having a minimum code length of 2, when two transmission antennas and two reception antennas are used.

However, the above-mentioned tilted-QAM scheme cannot sufficiently acquire a coding gain, and configures a code using the combination of several data symbols, such that it has a disadvantage in that an encoding complexity unavoiably increases.

In conclusion, there must be newly developed a new space-time code (STC), which has higher efficiency and lower encoding complexity in consideration of diversity and coding gain.

DISCLOSURE OF INVENTION

Accordingly, the present invention is directed to a method for transmitting a signal for use in a multi-antenna system that substantially obviates one or more problems due to limitations and disadvantages of the related art.

An object of the present invention is to provide a method for providing a signal for use in a multi-antenna system with an FDFR-STC code having higher performance and lower encoding complexity, and increasing communication efficiency using the FDFR-STC code.

To achieve these objects and other advantages and in accordance with the purpose of the invention, as embodied and broadly described herein, a signal transmission method for use in a multi-antenna system comprising: receiving a complex signal using N antennas and M timeslots as a single unit, and generating a space-time code (STC) for performing interleaving and phase-shifting operations of the received complex signal; and applying the space-time code (STC) to the received complex signal, and transmitting the resultant signal.

In another aspect of the present invention, there is provided a method for transmitting a signal by applying a space-time coding (STC) process to two or more antennas comprising: performing a matched-filtered matrix of a received signal matrix, applying a space-time coding (STC) matrix capable of setting the remaining matrix components other than a block diagonal component to "0" to the matched-filtered matrix, and performing a multi-antenna encoding of a symbol; and transmitting the multi-antenna encoded symbol via the two or more antennas.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference indexes will be used throughout the drawings to refer to the same or like parts.

The communication technology for multi-antenna is used to increase capacity, throughput, and coverage of a system.

A representative example of the multi-antenna associated technology is a spatial multiplexing (SM) scheme and a space-time code (STC) scheme.

The SM scheme allows a transmission end to transmit separate data (i.e., independent data) via individual antennas, such that it can maximize a transmission rate.

The STC scheme performs the coding process at a symbol level of space- and time-domains, such that it can acquire an antenna diversity gain and a coding gain.

The following Table 1 shows exemplary STC codes for the above-mentioned STC scheme.

TABLE 1

| Scheme | Rate | The number of Tx Antennas | Rank | dp · min QPSK |
|---|---|---|---|---|
| (1) $\frac{1}{\sqrt{2}}\begin{bmatrix} S_1 & -S_2^* \\ S_2 & S_1 \end{bmatrix}$ | 1 | 2 | 2 | 1 |
| (2) $\frac{1}{\sqrt{2}}\begin{bmatrix} S_1 \\ S_2 \end{bmatrix}$ | 2 | 2 | 1 | 1 |
| (3) $\frac{1}{\sqrt{2(1+r^2)}}\begin{bmatrix} S_1+jr \cdot S_4 & r \cdot S_2+S_3 \\ S_2-rS_3 & jr \cdot S_1+S_4 \end{bmatrix}, r=\frac{\sqrt{5}\pm 1}{2}$ | 2 | 2 | 2 | 0.2 |

In Table 1, the reference number (1) is indicative of an Alamouti code. The Alamouti code has a spatial multiplexing (SM) rate of 1, however, it can maximally acquire the diversity and the coding gain.

The reference number (2) is indicative of the spatial multiplexing (SM) scheme. The spatial multiplexing (SM) scheme acquires a spatial multiplexing (SM) rate of 2 using 2 transmission (Tx) antennas and 2 reception (Rx) antennas, and at the same time increases a diversity gain.

The space-time coding (STC) scheme applied to the multi-antenna can be represented by a Linear Dispersion Coding (LDC) matrix. In other words, the multi-antenna encoding can be represented by the following equation 1:

$$S = \sum_{q=1}^{Q} S_q M_q \quad \text{[Equation 1]}$$

In Equation 1, "S" is indicative of a transmission matrix, an i-th row of the transmission matrix "S" is indicative of symbols transmitted to the i-th time, and a j-th column is indicative of a symbol transmitted via a j-th transmission (Tx) antenna. $M_q$ is indicative of a dispersion matrix (T×$N_t$) multiplied by a q-th transmission data symbol, S is indicative of a transmission matrix, T is indicative of an LDC period, and $N_t$ is indicative of the number of transmission (Tx) antennas. In the meantime, Q is indicative of the number of transmission data during a single LDC period, and is denoted by $S_q = \alpha_q + j\beta_q$.

Typically, if a real part $\alpha_q$ and an imaginary part $\beta_q$ of the $S_q$ value disperse in the space-time area by different dispersion matrices, a transmission matrix S can be represented by the following equation 2:

$$S = \sum_{q=1}^{Q} (\alpha_q A_q + j\beta_q B_q) \quad \text{[Equation 2]}$$

In Equation 2, $A_q$ is indicative of a dispersion matrix (T×$N_t$) multiplied by the real part, and $B_q$ is indicative of a dispersion matrix (T×$N_t$) multiplied by the imaginary part. If the signal is transmitted as described above, a signal received via the reception (Rx) antenna can be represented by the following equation 3 on the condition that the LDC matrix multiplied by the $S_q$ value:

$$\begin{bmatrix} y_1 \\ \vdots \\ y_N \end{bmatrix} = H_\chi \begin{bmatrix} S_1 \\ \vdots \\ S_N \end{bmatrix} + \begin{bmatrix} n_1 \\ \vdots \\ n_N \end{bmatrix} \quad \text{[Equation 3]}$$

In Equation 3, $n_r$ is indicative of reception (Rx) noise of a r-th antenna, $y_k$ is indicative of the value of a k-th reception antenna signal, $S_k$ is indicative of a signal transmitted from a transmission end. In the meantime, the value "$\chi$" can be represented by the following equation 4:

$$\chi = [\text{vec}(M_0)\text{vec}(M_1) \ldots \text{vec}(M_Q)] \quad \text{[Equation 4]}$$

In the linear dispersion coding (LDC) denoted by Equation 1, an equivalent channel response (also called an equivalence channel response) can be represented by the following equation 5:

$$\mathcal{H} = I_T \otimes H \quad \text{[Equation 5]}$$

In Equation 5, $\mathcal{H}$ is indicative of an equivalent channel response, $I_T$ is indicative of the T×T identity matrix, and H is indicative of the $N_r \times N_r$ channel matrix.

More generally, if the linear dispersion coding (LDC) is represented by Equation 2, the signal received in the reception (Rx) antenna can be represented by the following equation 6:

$$\begin{bmatrix} y_{R,1} \\ y_{I,1} \\ \vdots \\ y_{R,N_\gamma} \\ y_{I,N_\gamma} \end{bmatrix} = \mathcal{H} \begin{bmatrix} \alpha_1 \\ \beta_1 \\ \vdots \\ \alpha_Q \\ \beta_Q \end{bmatrix} + \begin{bmatrix} n_{R,1} \\ n_{I,1} \\ \vdots \\ n_{R,N_\gamma} \\ n_{I,N_\gamma} \end{bmatrix} \quad \text{[Equation 6]}$$

In Equation 6, the subscript R is indicative of a real part of a complex signal, the subscript I is indicative of an imaginary part. In this case, the equivalent channel response $\mathcal{H}$ can be represented by the following equation 7:

$$\mathcal{H} = \begin{bmatrix} \mathcal{A}_1 h_1 & \mathcal{B}_1 h_1 & \cdots & \mathcal{A}_Q h_1 & \mathcal{B}_Q h_1 \\ \vdots & \vdots & \ddots & \vdots & \vdots \\ \mathcal{A}_1 h_{N_\gamma} & \mathcal{B}_1 h_{N_\gamma} & \cdots & \mathcal{A}_Q h_{N_\gamma} & \mathcal{B}_Q h_{N_\gamma} \end{bmatrix} \quad \text{[Equation 7]}$$

In Equation 7, the value of $\mathcal{A}_q$ is denoted by $$\mathcal{A}_q = \begin{bmatrix} A_{R,q} & -A_{I,q} \\ A_{I,q} & A_{R,q} \end{bmatrix},$$

the value of $\mathcal{A}_q$ is denoted by $$\mathcal{B}_q = \begin{bmatrix} -B_{I,q} & -B_{R,q} \\ B_{R,q} & -B_{I,q} \end{bmatrix},$$

and the value of $\underline{h}_n$ is denoted by $$\underline{h}_n = \begin{bmatrix} h_{R,n} \\ h_{I,n} \end{bmatrix}.$$

In the meantime, $h_{R,n}$ is indicative of a real part of a channel response vector received via a N-th reception (Rx) antenna, $h_{I,n}$ is indicative of an imaginary part of the channel response vector received via the N-th reception (Rx) antenna.

The multi-antenna decoding process is adapted to estimate $\alpha_q$ and $\beta_q$ values according to Equation 3 or 6 or its equivalent equation.

The present invention will hereinafter disclose a superior space-time code (STC) with reference to the following first and second preferred embodiments.

The first preferred embodiment of the present invention will hereinafter be described in detail.

First Preferred Embodiment

A method for generating a space-time code (STC) for acquiring a maximum multiplexing gain and a maximum diversity gain from a communication system having two transmission (Tx) antennas and two reception (Rx) antennas is explained as follows.

In other words, the above-mentioned communication system rotates individual complex data symbols on a constellation map, and performs interleaving of imaginary parts of two rotated signals to achieve a maximum diversity gain. As a result, the communication system transmits a signal via only one antenna during a single timeslot, and allows all the data symbols to acquire the maximum diversity gain.

Firstly, the space-time code (STC) can be represented by the following equation 8:

$$CIOD^{2\times 1} = \begin{pmatrix} \tilde{x}_1 & 0 \\ 0 & \tilde{x}_2 \end{pmatrix} \quad \text{[Equation 8]}$$

In Equation 8, $x_i$ is indicative of $S_i e^{j\theta}$ (where i=1 and 2), as denoted by $x_i = S_i e^{j\theta}$, i=1,2, and $\tilde{x}_1$ is indicative of $\tilde{x}_1 = x_1^R + jx_2^I$, $\tilde{x}_2 = x_2^R + jx_1^I$.

In order to maintain the diversity gain of Equation 8 and acquire the spatial multiplexing (SM) rate of 2, the communication system uses a determinant reference denoted by the following equation 9:

$$\gamma = \operatorname*{argmax}_{C^k \neq C^l} \min |\det(C^k - C^l)| \quad \text{[Equation 9]}$$

In Equation 9, $C^k$ is indicative of a code created from a k-th data symbol set of the C value created by a data symbol set, and $C^l$ is indicative of a code created from a l-th data symbol set.

In Equation 9, if the $\gamma$ value is not equal to "0", the space-time code (STC) of Equation 8 can acquire the maximum diversity gain. The higher the $\gamma$ value becomes, the higher the coding rate is. Therefore, as can be seen from Equation 8, the space-time code (STC) capable of maximizing the $\gamma$ value can acquire an optimum performance.

Figure 3:
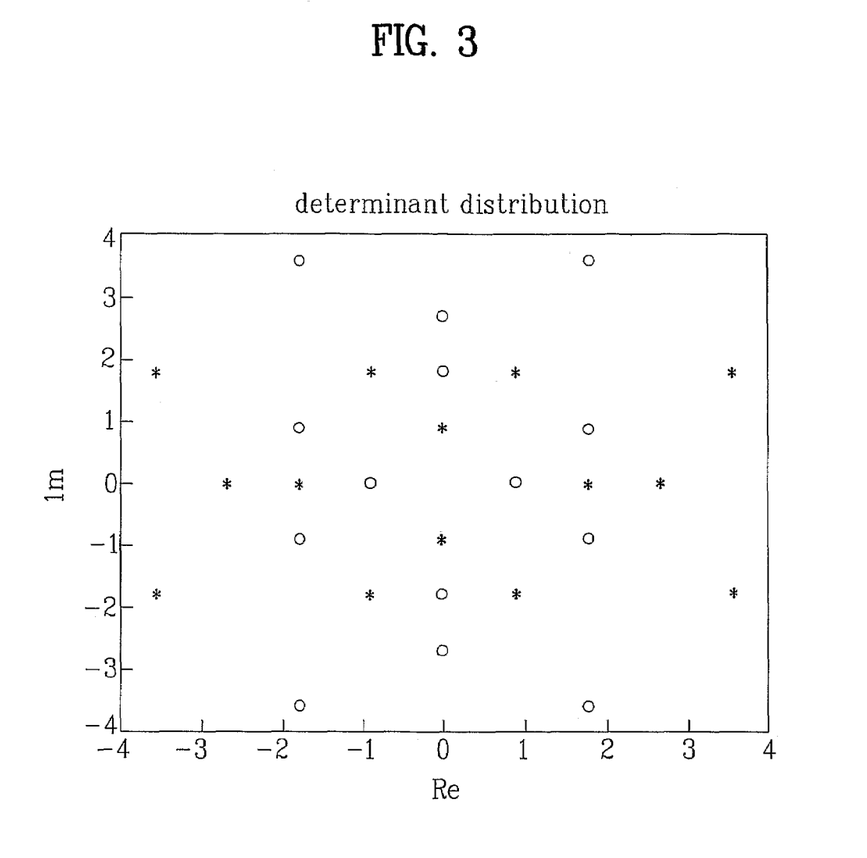
FIG. 3 shows a determinant distribution of a difference matrix of $C^k$ and $C^1$ codes according to the present invention.

FIG. 3 shows a determinant distribution of a difference matrix of $C^k$ and $C^l$ codes according to the present invention. Data symbols of FIG. 3 exemplarily show the 4-QAM modulation scheme.

In order to acquire the space-time code (STC) of the spatial multiplexing (SM) rate of 2, the determinant distribution of the difference matrix of $C^k$ and $C^l$ codes can be configured in the form of FIG. 3.

In other words, it can be recognized that the determinant distribution of difference matrix of the space-time code (STC) is mainly located at a real part. Therefore, in order to allow the determinant distribution to be located at an imaginary part, other data symbols are inserted into an off-diagonal part of Equation 8, as denoted by the following equation 10. If the distribution rotates on the determinant distribution of FIG. 3, the magnitude of a minimum determinant is not effected by the rotating distribution, and the spatial multiplexing rate increases to "2", such that the diversity gain and the coding rate can be maximized.

Equation 10 shows an exemplary space-time code (STC) scheme in which each timeslot transmits different space-time signals to individual antennas in 2-timeslot units. In this case, each space-time signal is created by the and interleaving-actions of data symbols. The row of the above-mentioned space-time code (STC) is indicative of transmission signals for individual antennas, and the column of the above-mentioned space-time code (STC) is indicative of a timeslot.

$$C_{New}^{2\times 2} = \begin{pmatrix} \tilde{x}_1 & \tilde{x}_2 e^{j\theta_{r1}} \\ \tilde{x}_4 e^{j\theta_{r2}} & \tilde{x}_3 \end{pmatrix} \quad \text{[Equation 10]}$$

In Equation 10, $x_i$ is indicative of $S_i e^{j\theta}$ (where i=1, ..., 4), as denoted by $x_i = S_i e^{j\theta}$, i=1, ..., 4, and $\tilde{x}_1$, $\tilde{x}_2$, $\tilde{x}_3$, and $\tilde{x}_4$ are denoted by $\tilde{x}_1 = x_1^R + jx_3^I$, $\tilde{x}_2 = x_2^R + jx_4^I$, $\tilde{x}_3 = x_3^R + jx_2^I$, and $\tilde{x}_4 = x_4^R + jx_2^I$, respectively.

In Equation 10, $S_i$, i=1, ..., 4 is indicative of a data symbol having a complex value, $\theta$, $\theta_{r1}$ and $\theta_{r2}$ are indicative of phase angles, and optimum values can be defined according to system characteristics. In Equation 10, $\theta_{r1}$ and $\theta_{r2}$ values are adapted to rotate the determinant distribution of FIG. 3. For example, the $\theta_{r1}$ and $\theta_{r2}$ values can be represented by the following equation 11:

$$\theta = \frac{1}{2}\tan^{-1}(2), \ \theta_{r1} = 0, \ \theta_{r2} = \frac{\pi}{2} \quad \text{[Equation 11]}$$

If $\theta_{r1}$, $\theta_{r2}$ values satisfy the following equation 12, the communication system can acquire a maximum diversity gain.

$$\theta_{r1} + \theta_{r2} = \frac{\pi}{2} \quad \text{[Equation 12]}$$

The space-time code (STC) created by performing a unitary transformation to Equation 10 has the same performance as that of Equation 10.

In the meantime, if Equation 10 is extended, the communication system can generate a space-time code (STC) capable of acquiring a maximum diversity gain and a maximum multiplexing gain from four transmission (Tx) antennas, as denoted by the following equation 13:

$$C_{New}^{4\times 1} = \begin{pmatrix} \tilde{x}_1 & \tilde{x}_2 e^{j\theta_{r1}} & 0 & 0 \\ \tilde{x}_4 e^{j\theta_{r2}} & \tilde{x}_3 & 0 & 0 \\ 0 & 0 & \tilde{x}_1 & \tilde{x}_2 e^{j\theta_{r1}} \\ 0 & 0 & \tilde{x}_4 e^{j\theta_{r2}} & \tilde{x}_3 \end{pmatrix} \quad \text{[Equation 13]}$$

If the communication signal transmits a signal using the above-mentioned space-time coding scheme, a receiver can receive the signal via a Maximum Likelihood (ML) decoder and a Minimum Mean Squared Error (MMSE) decoder.

Figure 4:
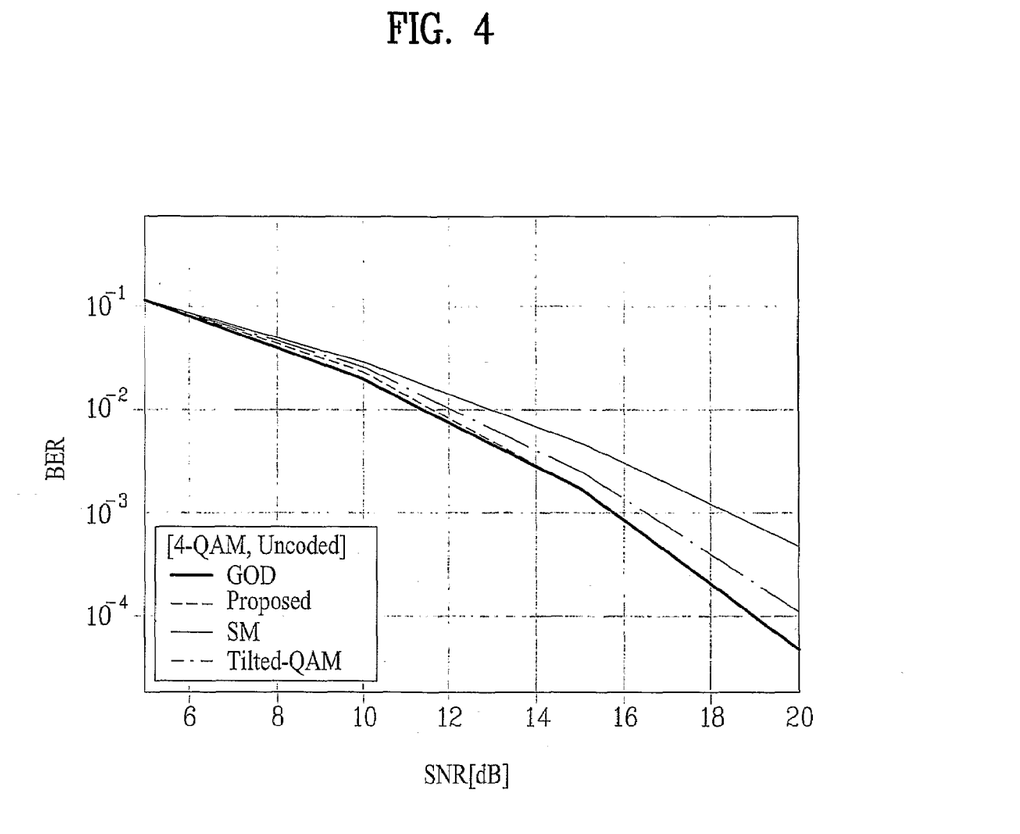
FIG. 4 is a graph illustrating the result of comparison between performances of a space-time code (STC) shown in Equation 8 and spatial multiplexing- (SM-) and generalized optimal diversity- (GOD-) codes according to the present invention.

FIG. 4 is a graph illustrating the result of comparison between performances of a space-time code (STC) shown in Equation 8 and Table 1's spatial multiplexing-(SM-) and generalized optimal diversity- (GOD-) codes according to the present invention.

As can be seen from FIG. 4, the space-time code (STC) of Equation 8 has the same performance as that of the GOD code (3) of Table 1, and is superior to that of the spatial multiplexing (SM) scheme having the same spatial multiplexing (SM) rate.

In the meantime, the space-time code (STC) of Equation 10 has an encoding complexity lower than that of the GOD code (3), such that it can be considered that the space-time code (STC) of Equation 10 is superior to that of the GOD code (3). The other code (1) of Table 1 has a low spatial multiplexing (SM) rate, such that the code (1) is not compared.

A second preferred embodiment of the present invention will hereinafter be described in detail.

Second Preferred Embodiment

A pairwise error probability (PEP) of the above-mentioned LDC structure can be represented by the following equation 14:

$$P(c \to e) \leq \left( \prod_{i=1}^{R} \lambda_i \right)^{-Nr} \cdot (E_s/4N_0)^{-R \cdot Nr} \quad \text{[Equation 14]}$$

In Equation 14, R is indicative of a rank of a difference matrix, and $\lambda$ is indicative of an eigen value of the difference matrix. The above-mentioned difference matrix is indicative of S–E, where S is indicative of a matrix of signals transmitted from a transmission (Tx) antenna and E is indicative of an erroneous matrix.

Figure 5:
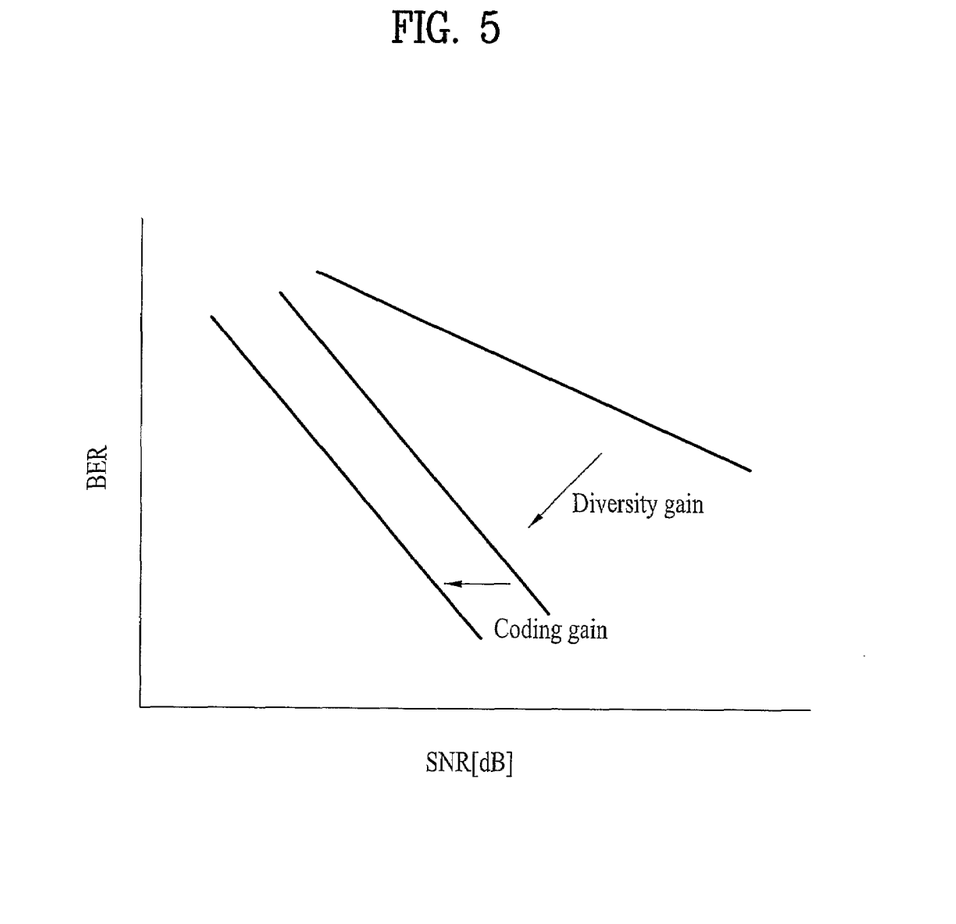
FIG. 5 is a graph illustrating LDC performances according to the present invention.
Figure 6A:
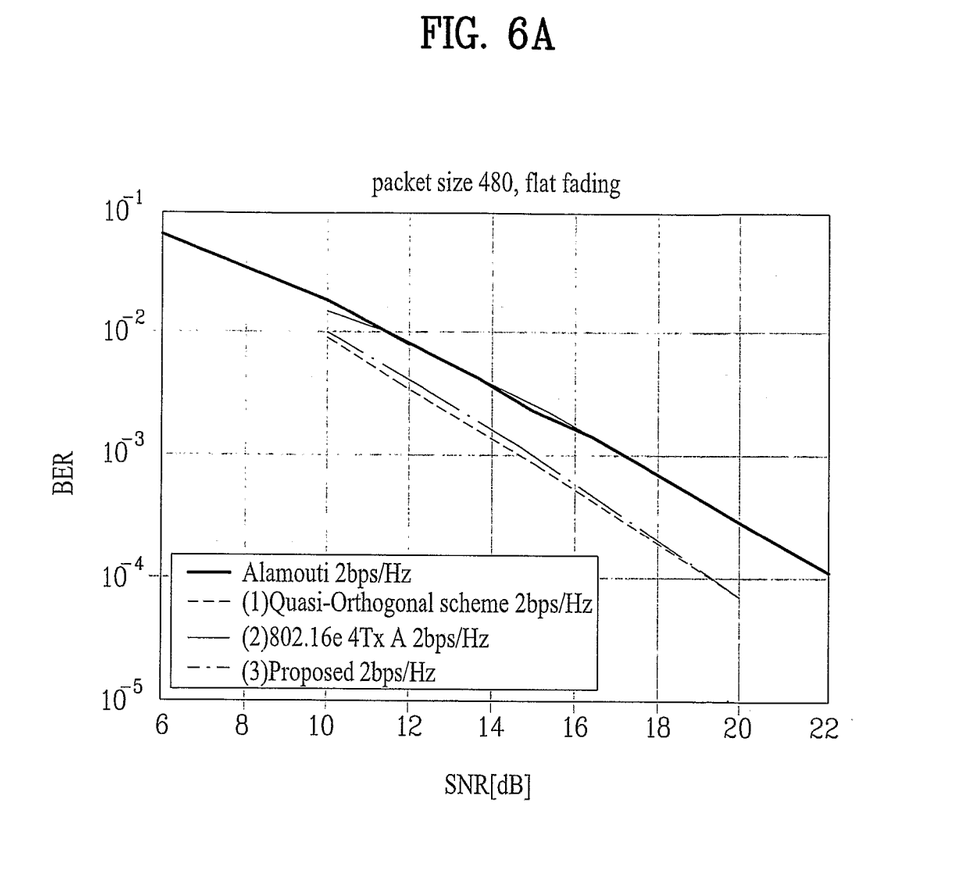
FIGS. 6A to 6D show SNR-to-BER characteristics acquired when the space-time codes (STCs) shown in (1), (2), and (3) of Table 2 are applied to a specific case in which four transmission antennas and a single reception antenna are provided according to the present invention.
Figure 6B:
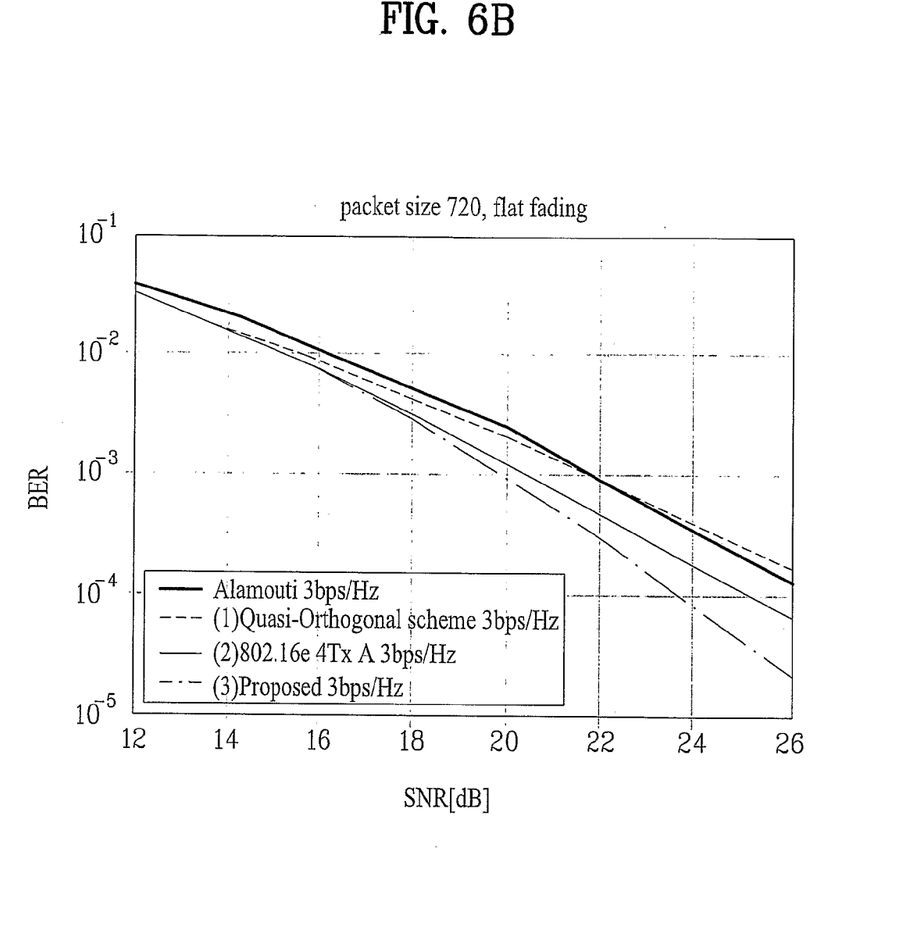
Figure 6C:
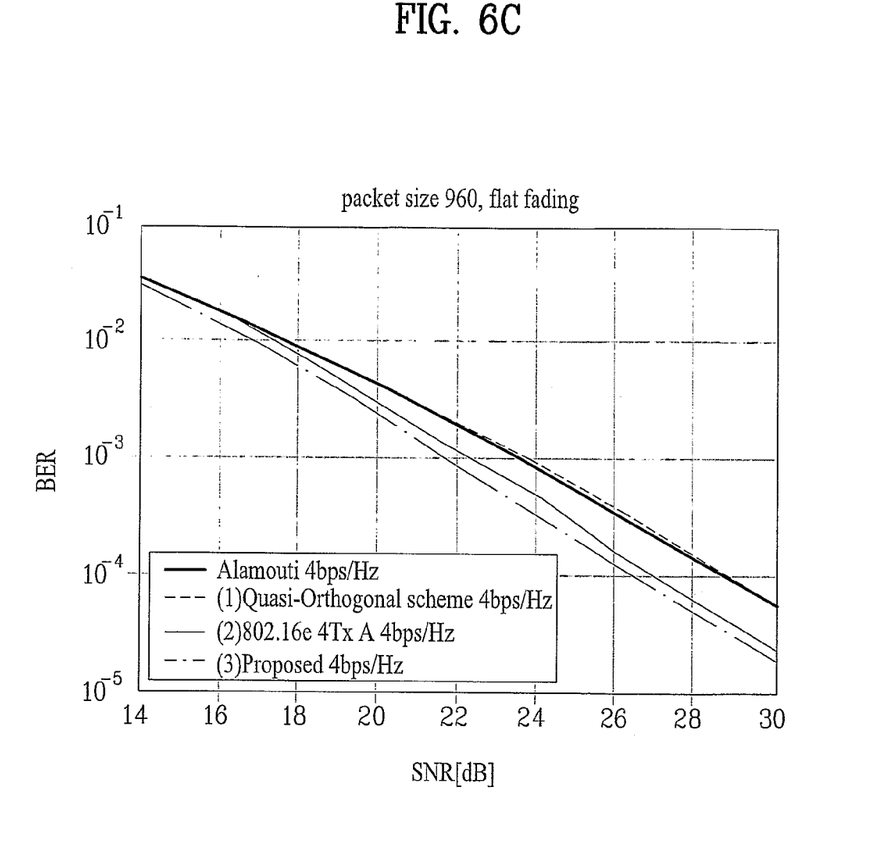
Figure 6D:
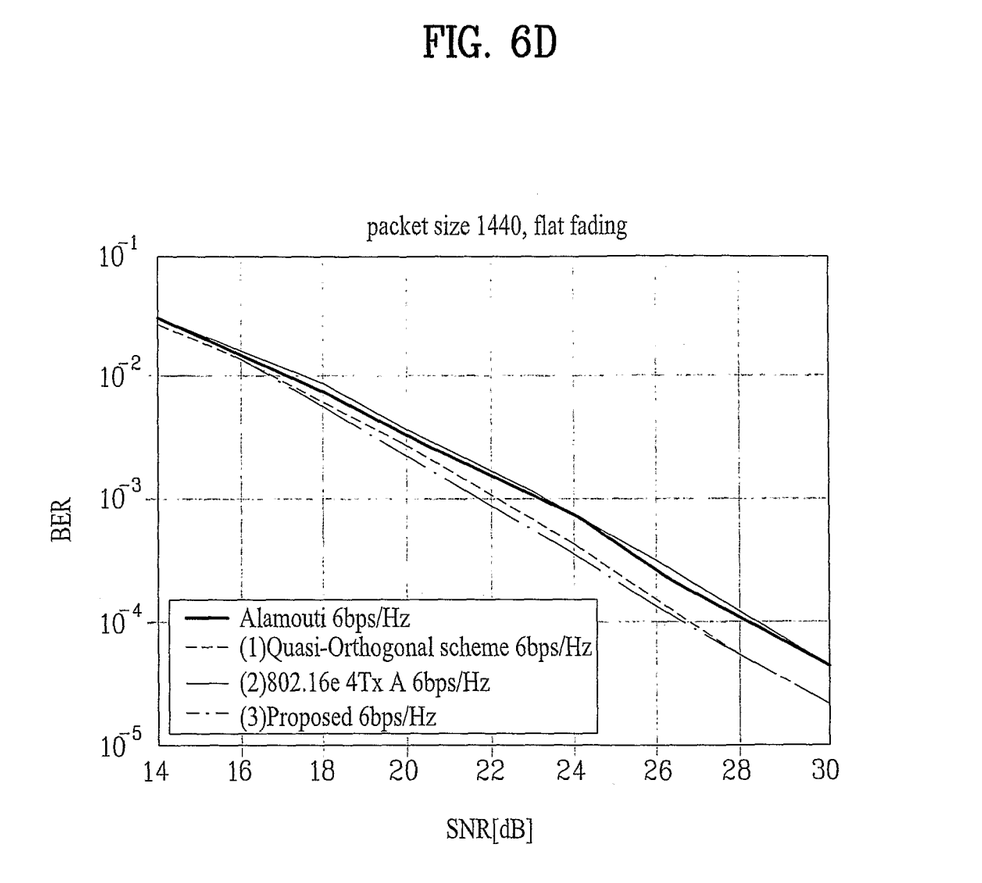

With reference to Equation 14, $R \cdot N_r$ is indicative of a diversity order from among multi-antenna performances, and the product of eigen values is equal to a LDC coding gain FIG. 5 is a graph illustrating LDC performances according to the present invention.

Referring to FIG. 5, if a diversity gain increases in a Bit Error Rate (BER) graph of a Signal to Noise Ratio (SNR), the slope increases. If the coding gain increases, it can be recognized that the graph moves to the left side. In other words, considering the SNR axis of a logarithmic, the higher the $R \cdot N_r$ value, the higher the slope.

The higher the product of $\lambda$, the closer the graph is to the left side. If the increasing slope or the graph moving to the left side indicates that an error rate becomes lower at the same SNR, resulting in the improvement of the system performance. Therefore, it can be recognized that the multi-antenna system performance depends upon the eigen value and rank of the LDC matrix.

The following Table 2 shows an exemplary full rate scheme having the STC rate of 1 on the condition that the communication system uses four transmission (Tx) antennas and four reception (Rx) antennas.

TABLE 2

| Scheme | Rate | Receiver Complexity | Rank | Coding Gain QPSK |
|---|---|---|---|---|
| (1) $\frac{1}{2}\begin{bmatrix} S_1 & S_2 & S_3 & S_4 \\ S_2^* & -S_1^* & S_4^* & -S_3^* \\ S_3 & -S_4 & -S_1 & S_2 \\ S_4^* & S_3^* & -S_2^* & -S_1^* \end{bmatrix}$ | 1 | Two Symbol Pair Detection | 2 | 2 2 4 |
| (2) $\frac{1}{\sqrt{2}}\begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}$ | 1 | Symbol By Symbol | 2 | 1 1 1 |
| (3) $\frac{1}{2}\begin{bmatrix} \alpha_1 - j\beta_3 & \alpha_2 - j\beta_4 & -\alpha_4 - j\beta_2 & \alpha_3 + j\beta_1 \\ -\alpha_2 - j\beta_4 & \alpha_1 + j\beta_3 & \alpha_3 - j\beta_1 & \alpha_4 - j\beta_2 \\ \alpha_4 - j\beta_2 & -\alpha_3 + j\beta_1 & \alpha_1 + j\beta_3 & \alpha_2 + j\beta_4 \\ -\alpha_3 - j\beta_1 & -\alpha_4 - j\beta_2 & -\alpha_2 + j\beta_4 & \alpha_1 - j\beta_3 \end{bmatrix}$ | 1 | Symbol By Symbol | 2 | 2 2 4 |

If the communication system uses a single reception (Rx) antenna and applies a matched filtering process in a receiver, an equivalent channel can be represented by the following equation 15:

$$\mathcal{H}^T\mathcal{H} = \begin{bmatrix} h_1^T\mathcal{A}_1^T \\ h_1^T\mathcal{B}_1^T \\ \vdots \\ h_1^T\mathcal{A}_Q^T \\ h_1^T\mathcal{B}_Q^T \end{bmatrix} [\mathcal{A}_1 h_1 \ \mathcal{B}_1 h_1 \ \ldots \ \mathcal{A}_Q h_1 \ \mathcal{B}_Q h_1]$$

$$= \begin{bmatrix} h_1^T\mathcal{A}_1^T\mathcal{A}_1 h_1 & h_1^T\mathcal{A}_1^T\mathcal{B}_1 h_1 & \ldots & h_1^T\mathcal{A}_1^T\mathcal{A}_Q h_1 & h_1^T\mathcal{A}_1^T\mathcal{B}_Q h_1 \\ h_1^T\mathcal{B}_1^T\mathcal{A}_1 h_1 & h_1^T\mathcal{B}_1^T\mathcal{B}_1 h_1 & \ldots & h_1^T\mathcal{B}_1^T\mathcal{A}_Q h_1 & h_1^T\mathcal{B}_1^T\mathcal{B}_Q h_1 \\ \vdots & \vdots & \ddots & \vdots & \vdots \\ h_1^T\mathcal{A}_Q^T\mathcal{A}_1 h_1 & h_1^T\mathcal{A}_Q^T\mathcal{B}_1 h_1 & \ldots & h_1^T\mathcal{A}_Q^T\mathcal{A}_Q h_1 & h_1^T\mathcal{A}_Q^T\mathcal{B}_Q h_1 \\ h_1^T\mathcal{B}_Q^T\mathcal{A}_1 h_1 & h_1^T\mathcal{B}_Q^T\mathcal{B}_1 h_1 & \ldots & h_1^T\mathcal{B}_Q^T\mathcal{A}_Q h_1 & h_1^T\mathcal{B}_Q^T\mathcal{B}_Q h_1 \end{bmatrix}$$

[Equation 15]

In more detail, provided that the communication system uses a linear receiver (e.g., a matched filter), and the matrix is configured in the form of a block diagonal matrix after the filtering process, a simple receiver can be configured.

In other words, the remaining component other than the block diagonal component is "0", such that the linear receiver can detect a signal transmitted from a transmitter without being affected by other signals which are not present in the block diagonal matrix.

Provided that the component other than the block diagonal component exists, "M" is set to a constellation size (e.g., M=4 under QPSK, and M=16 under 16QAM), "Q" is set to the number of signals transmitted via a single STC unit, the number of calculations corresponding to "$M^Q$" must be performed to detect the signals at the receiver.

However, provided that the matrix is composed of only the block diagonal component, and "B" is set to the number of block diagonal blocks, the number of $M^{Q/B} \cdot B$ calculations is performed, such that a desired signal can be detected.

The smaller the sub-block of the block diagonal component, the lower the complexity of the receiver. In the meantime, a power constraint condition for antennas can be represented by the following equation 16:

$$x^T \mathcal{A}_i^T \mathcal{A}_i x = x^T \mathcal{E}^T \mathcal{E} x = \alpha I, \forall x, i$$ [Equation 16]

Provided that the STC matrix is composed of 0, −1, and −1 in the case of using four transmission (Tx) antennas, a matrix satisfying the equation 16 includes 384 components associated with a predetermined vector "x".

In order to decode a single symbol at a time, and allow an off-diagonal part of Equation 15 to be "0", the equation 17 must be satisfied.

$$x^T \begin{bmatrix} A_i^T A_j & 0 \\ 0 & A_i^T A_j \end{bmatrix} x = x^T \begin{bmatrix} B_i^T B_j & 0 \\ 0 & B_i^T B_j \end{bmatrix} x$$ [Equation 17]

$$= x^T \begin{bmatrix} 0 & -A_i^T B_j \\ A_i^T B_j & 0 \end{bmatrix} x$$

$$= x^T \begin{bmatrix} 0 & B_i^T A_j \\ -B_i^T A_j & 0 \end{bmatrix} x$$

$$= 0, \forall x$$

Provided that four symbols are transmitted in STC units on the condition that four transmission (Tx) antennas are provided, the matrices A and B for satisfying Equations 16 and 17 can be represented by the following equations 18 and 19, respectively:

$$A_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$ [Equation 18]

$$A_2 = \begin{bmatrix} 0 & 1 & 0 & 0 \\ -1 & 0 & 0 & 0 \\ 0 & 0 & 0 & 1 \\ 0 & 0 & -1 & 0 \end{bmatrix}$$

$$A_3 = \begin{bmatrix} 0 & 0 & 0 & 1 \\ 0 & 0 & 1 & 0 \\ 0 & -1 & 0 & 0 \\ -1 & 0 & 0 & 0 \end{bmatrix}$$

$$A_4 = \begin{bmatrix} 0 & 0 & -1 & 0 \\ 0 & 0 & 0 & 1 \\ 1 & 0 & 0 & 0 \\ 0 & -1 & 0 & 0 \end{bmatrix}$$

$$A_1' = -A_1, \quad A_2' = -A_2, \quad A_3' = -A_3, \quad A_4' = -A_4,$$

$$B_1 = \begin{bmatrix} 0 & 0 & 0 & 1 \\ 0 & 0 & -1 & 0 \\ 0 & 1 & 0 & 0 \\ -1 & 0 & 0 & 0 \end{bmatrix}$$ [Equation 19]

$$B_2 = \begin{bmatrix} 0 & 0 & -1 & 0 \\ 0 & 0 & 0 & -1 \\ -1 & 0 & 0 & 0 \\ 0 & -1 & 0 & 0 \end{bmatrix}$$

$$B_3 = \begin{bmatrix} -1 & 0 & 0 & 0 \\ 0 & 1 & 0 & 0 \\ 0 & 0 & 1 & 0 \\ 0 & 0 & 0 & -1 \end{bmatrix}$$

$$B_4 = \begin{bmatrix} 0 & -1 & 0 & 0 \\ -1 & 0 & 0 & 0 \\ 0 & 0 & 0 & -1 \\ 0 & 0 & 1 & 0 \end{bmatrix}$$

$$B_1' = -B_1, \quad B_2' = -B_2, \quad B_3' = -B_3, \quad B_4' = -B_4.$$

In association with the A matrix from among the above-mentioned matrices, a single matrix is selected from among the ($A_1$, $A_1'$) matrix, a single matrix is selected from among the $(A_2, A_2')$ matrix, a single matrix is selected from among the $(A_3, A_3')$ matrix, and a single matrix is selected from among the $(A_4, A_4')$ matrix.

In association with the B matrix from among the above-mentioned matrices, a single matrix is selected from among the $(B_1, B_1')$ matrix, a single matrix is selected from among the $(B_2, B_2')$ matrix, a single matrix is selected from among the $(B_3, B_3')$ matrix, and a single matrix is selected from among the $(B_4, B_4')$ matrix.

As a result, the dispersion matrix of Equation 2 can be configured.

The STC matrix of Table 2's (3) is composed of A matrices $(A_1, A_2, A_3,$ and $A_4)$ and B matrices $(B_1, B_2, B_3,$ and $B_4)$.

In other words, the method for constructing the STC matrix shown in Table 2's (3) using the A matrices $(A_1, A_2, A_3,$ and $A_4)$ and the B matrices $(B_1, B_2, B_3,$ and $B_4)$ is represented by the following equation 20:

$$\frac{1}{2}\begin{bmatrix} \alpha_1 - j\beta_3 & \alpha_2 - j\beta_4 & -\alpha_4 - j\beta_2 & \alpha_3 + j\beta_1 \\ -\alpha_2 - j\beta_4 & \alpha_1 + j\beta_3 & \alpha_3 - j\beta_1 & \alpha_4 - j\beta_2 \\ \alpha_4 - j\beta_2 & -\alpha_3 + j\beta_1 & \alpha_1 + j\beta_3 & \alpha_2 + j\beta_4 \\ -\alpha_3 - j\beta_1 & -\alpha_4 - j\beta_2 & -\alpha_2 + j\beta_4 & \alpha_1 - j\beta_3 \end{bmatrix} =$$

[Equation 20]

$$\alpha_1 \times \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \beta_1 \times \begin{bmatrix} 0 & 0 & 0 & 1 \\ 0 & 0 & -1 & 0 \\ 0 & 1 & 0 & 0 \\ -1 & 0 & 0 & 0 \end{bmatrix} +$$

$$\alpha_2 \times \begin{bmatrix} 0 & 1 & 0 & 0 \\ -1 & 0 & 0 & 0 \\ 0 & 0 & 0 & 1 \\ 0 & 0 & -1 & 0 \end{bmatrix} + \beta_2 \times \begin{bmatrix} 0 & 0 & -1 & 0 \\ 0 & 0 & 0 & -1 \\ -1 & 0 & 0 & 0 \\ 0 & -1 & 0 & 0 \end{bmatrix} +$$

$$\alpha_3 \times \begin{bmatrix} 0 & 0 & 0 & 1 \\ 0 & 0 & 1 & 1 \\ 0 & -1 & 0 & 0 \\ -1 & 0 & 0 & 0 \end{bmatrix} + \beta_3 \times \begin{bmatrix} -1 & 0 & 0 & 0 \\ 0 & 1 & 0 & 0 \\ 0 & 0 & 1 & 0 \\ 0 & 0 & 0 & -1 \end{bmatrix} +$$

$$\alpha_4 \times \begin{bmatrix} 0 & 0 & -1 & 0 \\ 0 & 0 & 0 & 1 \\ 1 & 0 & 0 & 0 \\ 0 & -1 & 0 & 0 \end{bmatrix} + \beta_4 \times \begin{bmatrix} 0 & -1 & 0 & 0 \\ -1 & 0 & 0 & 0 \\ 0 & 0 & 0 & -1 \\ 0 & 0 & 1 & 0 \end{bmatrix}$$

Although Table 2 and Equation 20 show only a single STC matrix, another STC matrix composed of the A and B matrices based on Equations 16 and 17 has the same performance as that of the above-mentioned single STC matrix.

In the meantime, if the symbol rotates on the constellation as shown in Equation 21, the communication system can acquire a higher diversity gain.

$$\tilde{S} = \exp(j\theta) \cdot S \quad \text{[Equation 21]}$$

For example, if the value of $\theta$ is equal to 0.1536 radian, a maximum diversity gain (also called a full diversity gain) can be acquired from a system for transmitting a signal via four antennas on the condition that the rank of the matrix of Equation 20 is set to "4".

In the meantime, the coding gain is set to "0.04". Therefore, if the coding gain is an important factor, the rotation for symbol is performed. The symbol rotation can also be performed, when the diversity gain is an important factor.

FIGS. 6A~6D show SNR-to-BER characteristics acquired when the space-time codes (STCs) shown in (1), (2), and (3) of Table 2 are applied to a specific case in which four transmission antennas and a single reception antenna are provided according to the present invention.

FIGS. 6A~6D show the flat fading having a single tap, The flat fading of FIGS. 6A~6D are acquired by experimental simulations executed under an environment which is not changed during the LDC period and has a new channel value during the next LDC period. FIGS. 6A~6D show the experimental results of QPSK, 8PSK, 16QAM, and 64QAM schemes. In the case of using the code of Table 2's (3), it can be recognized that the SNR-to-BER characteristics are considerably improved.

The signal transmission method for use in a multi-antenna system according to the present invention has the following effects provides a space-time code (STC) having higher performance and lower encoding complexity, and can effectively transmit the signal via the multi-antenna system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

Industrial Applicability

As apparent from the above description, a method for transmitting a signal for use in a multi-antenna system according to the system provides a space-time code (STC) provides a space-time code (STC) having higher performance and lower encoding complexity, and can effectively transmit the signal via the multi-antenna system.

What is claimed is:

1. A method of transmitting signals in a multi-antenna system, the method comprising:

generating a space-time code (STC) which performs an interleaving operation and a phase shift operation on acquired signals, wherein the space-time code is generated for N antennas and M time slots;

performing a coding of the acquired signals using the generated space-time code; and transmitting the coded signals via a plurality of antennas, wherein the space-time code is represented as a matrix having N rows and M columns, and wherein the space-time code includes a matrix $C_{New}^{2 \times 2}$ as denoted by equation:

$$C_{New}^{2 \times 2} = \begin{pmatrix} \tilde{x}_1 & \tilde{x}_2 e^{j\theta_{r1}} \\ \tilde{x}_4 e^{j\theta_{r2}} & \tilde{x}_3 \end{pmatrix},$$

where $jx_1^{imaginary}$, and $\tilde{x}_4 = x_4^{Real} + jx_2^{imaginary}$, where $x_i^{Real}$ is indicative of a real part of $x_i$ (i=1, ..., 4), where $x_i^{imaginary}$ is indicative of an imaginary part of $x_i$ (i=1, ..., 4), where $x_i$ (i=1, ..., 4) is indicative of $S_i e^{j\theta}$ (i=1, ..., 4), as denoted by $x_i = S_i e^{j\theta}$, 1, ..., 4 where $s_i$, i=1, ..., 4 is a data symbol having a complex value of the acquired signals, $\theta$ is a phase angle of the acquired signals, and $\theta_{r1}$ and $\theta_{r2}$ are phase-shifting angles, wherein N is 2, and M is 2, and wherein a sum of the value of $\theta_{r1}$ and the value of $\theta_{r2}$ is equal to $$\frac{\pi}{2},$$

as denoted by $$\theta_{r1} + \theta_{r2} = \frac{\pi}{2}.$$

2. The method of claim 1, wherein the value of θ of $S_i e^{j\theta}$ is denoted by equation:

$$\theta = \frac{1}{2}\tan^{-1}(2),$$

and
wherein the value of $\theta_{r1}$ is 0, and the value of $\theta_{r2}$ is $$\frac{\pi}{2}.$$

3. The method of claim 1, wherein:
the space-time code (STC) is created by unitary transformation of the matrix $C_{New}^{2\times 2}$.

4. A method of transmitting signals in a multi-antenna system, the method comprising:
generating a space-time code (STC) which performs an interleaving operation and a phase shift operation on acquired signals, wherein the space-time code is generated for N antennas and M time slots;
performing a coding of the acquired signals using the generated space-time code; and
transmitting the coded signals via a plurality of antennas,
wherein the space-time code is represented as a matrix having N rows and M columns, and
wherein the space-time code includes a matrix $C_{New}^{4\times 1}$ as denoted by equation:

$$C_{New}^{4\times 1} = \begin{pmatrix} \tilde{x}_1 & \tilde{x}_2 e^{j\theta_{r1}} & 0 & 0 \\ \tilde{x}_4 e^{j\theta_{r2}} & \tilde{x}_3 & 0 & 0 \\ 0 & 0 & \tilde{x}_1 & \tilde{x}_2 e^{j\theta_{r1}} \\ 0 & 0 & \tilde{x}_4 e^{j\theta_{r2}} & \tilde{x}_3 \end{pmatrix},$$

where $\tilde{x}_1 = x_1^{Real} + jx_3^{imaginary}$, $\tilde{x}_2 = x_2^{Real} + jx_4^{imaginary}$, $\tilde{x}_3 = x_3^{Real} + jx_1^{imaginary}$, and $\tilde{x}_4 = x_4^{Real} + jx_2^{imaginary}$,
where $x_i^{Real}$ is indicative of a real part of $x_i$ (i=1, ..., 4),
where $x_i^{imaginary}$ is indicative of an imaginary part of $x_i$ (i=1, ..., 4),
where $x_i$ (i=1, ..., 4) is indicative of $S_i e^{j\theta}$ (i=1, ..., 4), as denoted by $x_i = s_i e^{j\theta}$, i=1, ..., 4
where $s_i$, i=1, ..., 4 is indicative of a data symbol having a complex value, and $\theta_{r1}$ and $\theta_{r2}$ are indicative of phase-shifted angles,
wherein N is 4, and M is 4.

5. The method of claim 4, wherein the space-time code (STC) is created by unitary transformation of the matrix $C_{New}^{4\times 1}$.

* * * * *